(12) United States Patent
Chisholm et al.

(10) Patent No.: US 8,087,177 B2
(45) Date of Patent: Jan. 3, 2012

(54) LEVEL

(75) Inventors: Ronald Chisholm, Truro (CA); Peter Alex, Antigonish County (CA)

(73) Assignee: Starboard Innovations Inc., Truro (CA)

( * ) Notice: Subject to any disclaimer, the term of this patent is extended or adjusted under 35 U.S.C. 154(b) by 0 days.

(21) Appl. No.: 12/659,049

(22) Filed: Feb. 24, 2010

(65) Prior Publication Data

US 2010/0223795 A1    Sep. 9, 2010

(30) Foreign Application Priority Data

Mar. 4, 2009 (CA) .................................... 2657143

(51) Int. Cl.
*B43L 7/00* (2006.01)
*G01C 9/24* (2006.01)

(52) U.S. Cl. .................. 33/451; 33/465; 33/383; 33/347

(58) Field of Classification Search ..................... 33/451, 33/465, 343, 383, 347
See application file for complete search history.

(56) References Cited

U.S. PATENT DOCUMENTS

| | | | | |
|---|---|---|---|---|
| 596,818 A * | 1/1898 | Moore | ............................. | 33/343 |
| 868,700 A * | 10/1907 | Roberts | ........................... | 33/451 |
| 997,551 A * | 7/1911 | Hall | ................................ | 33/451 |
| 1,014,402 A * | 1/1912 | Larsen | ............................ | 33/383 |
| 1,855,394 A * | 4/1932 | Hill | .................................. | 33/374 |
| 2,277,071 A * | 3/1942 | Cassell | .......................... | 33/388 |
| 2,640,268 A * | 6/1953 | Thompson | ..................... | 33/451 |
| 2,692,440 A * | 10/1954 | Walters | .......................... | 33/383 |
| 4,073,062 A * | 2/1978 | Wright | ........................... | 33/388 |
| 4,144,650 A * | 3/1979 | Rawlings et al. | ............... | 33/451 |
| 4,327,501 A * | 5/1982 | Hurt | ................................ | 33/465 |
| 4,394,801 A * | 7/1983 | Thibodeaux | ................... | 33/496 |
| 4,481,720 A * | 11/1984 | Sury | ............................... | 33/451 |
| 4,876,798 A * | 10/1989 | Zimmerman | ................ | 33/348.2 |
| 4,920,658 A * | 5/1990 | Hile | ................................ | 33/499 |
| 5,001,838 A * | 3/1991 | Huxley et al. | ................. | 33/388 |
| 5,199,177 A * | 4/1993 | Hutchins et al. | ............. | 33/348.2 |
| 5,459,935 A * | 10/1995 | Paulson et al. | .................. | 33/451 |
| 5,519,942 A * | 5/1996 | Webb | ............................. | 33/290 |
| 5,713,135 A * | 2/1998 | Acopulos | ....................... | 33/451 |
| 6,195,902 B1 * | 3/2001 | Jan et al. | ......................... | 33/286 |
| 6,543,144 B1 * | 4/2003 | Morin | ........................ | 33/27.032 |
| 6,763,598 B1 * | 7/2004 | Chen | .............................. | 33/286 |
| 7,299,560 B2 * | 11/2007 | Diaz et al. | ....................... | 33/471 |
| 7,316,074 B2 * | 1/2008 | Tran et al. | ....................... | 33/451 |
| 7,363,719 B2 * | 4/2008 | Levinson et al. | ................ | 33/384 |
| 7,513,055 B2 * | 4/2009 | Montgomery | .................. | 33/451 |
| 2007/0234581 A1 * | 10/2007 | Ming | ............................. | 33/451 |

* cited by examiner

Primary Examiner — Christopher Fulton
(74) Attorney, Agent, or Firm — George A. Seaby

(57) ABSTRACT

A combination level/try square includes an elongated body with an arm at one end thereof. The arm is rotatable between a non-use position against the body and a use position in which the body and the arm define a try square. The body incorporates three indicators, namely a plumb indicator, a level indicator and a slope indicator. In a second embodiment, a laser pointer is provided on one end of the body.

8 Claims, 5 Drawing Sheets

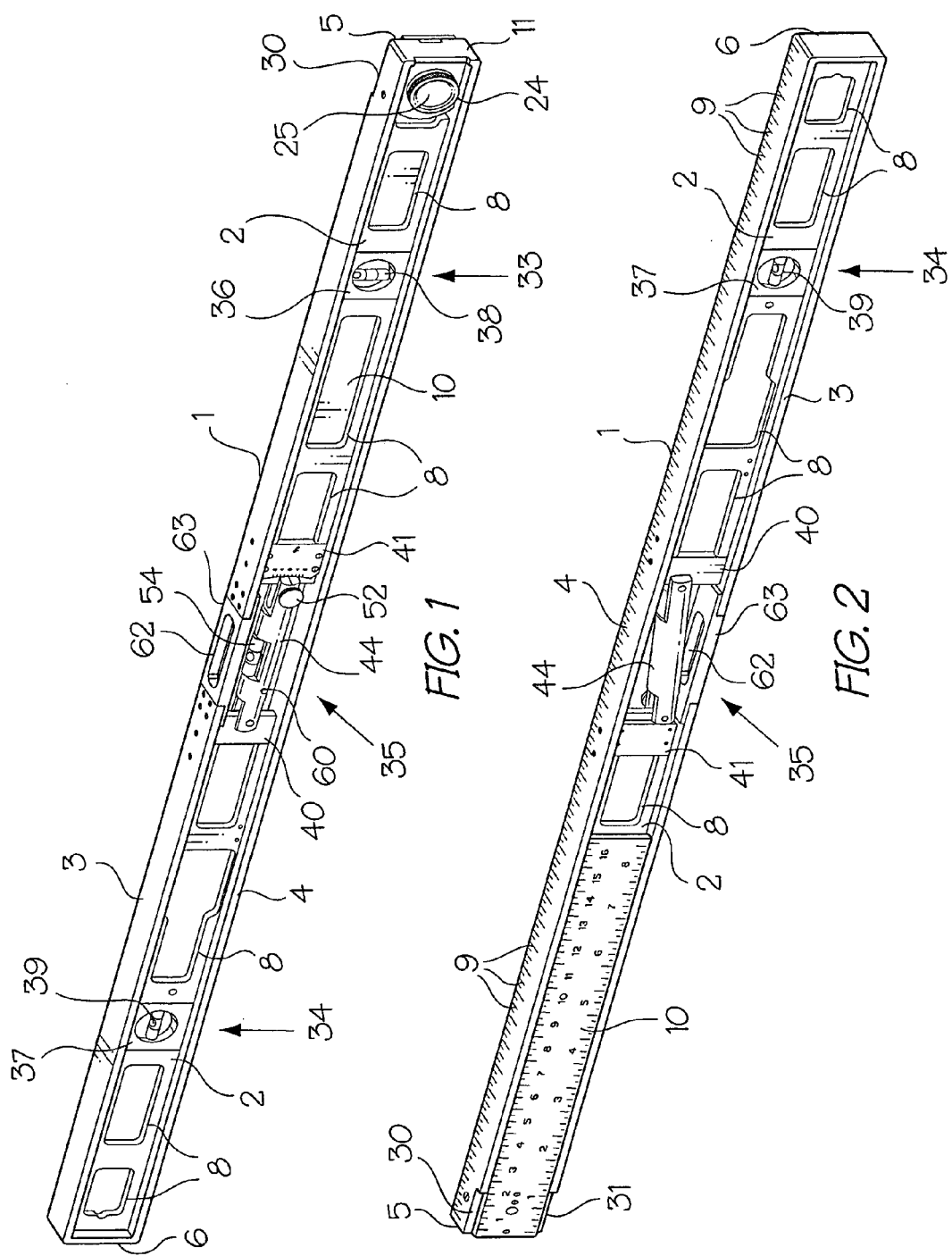

ature.
LEVEL

BACKGROUND OF THE INVENTION

This invention relates to a level.

FIELD OF THE INVENTION

More specifically, the invention relates to a level which can be converted into a try square, and which incorporates a plumb indicator, a level indicator, a slope indicator and a laser pointer.

DESCRIPTION OF RELATED ART

There are a great many patents and applications relating to levels or combination levels and squares. Examples of such patents and applications include Canadian Patents Nos. 1,067,689, issued to George A. Johnson on Dec. 11, 1979, No. 1,044,009, issued to Donald E. Wright on Dec. 12, 1978, No. 1,230,224, issued to Denis M. LaFreniere on Dec. 15, 1987, No. 1,273,912, issued to Harold Zimmerman on Sep. 11, 1990, No. 2,083,662, issued to Walter J. Hutchins et al on Nov. 21, 2000 and 2,323,602, issued to Bruno Morin on Dec. 30, 2008, and Canadian Patent Applications Nos. 2,030,016, filed in the name of Jacques Malouin on Nov. 15, 1990 and 2,592,865, filed in the name of Ed Vaes on Jan. 26, 2006, and U.S. Pat. No. 2,277,071, issued to J. T. Cassell on Mar. 24, 1942, U.S. Pat. No. 2,692,440, issued to R. H. Walters on Oct. 26, 1954, U.S. Pat. No. 5,001,838, issued to Mary E. Huxley et al on Mar. 26, 1991, U.S. Pat. No. 5,025,567, issued to Robert E. McWilliams et al on Jun. 25, 1991, U.S. Pat. No. 5,459,935, issued to Eldon D. Paulson et al on Oct. 24, 1995, U.S. Pat. No. 6,742,271, issued to Donald Jeffrey Rushing on Jun. 1, 2004 and U.S. Pat. No. 7,299,560, issued to Jeffrey Diaz et al on Nov. 27, 2007.

In spite of the large number of patents and applications relating to levels, very few of the devices appear in the marketplace. The reason for this is that many of the levels are somewhat complicated and consequently expensive to manufacture.

BRIEF SUMMARY OF THE INVENTION

The present invention provides a level which is structurally relatively simple, versatile and easy to manufacture.

Accordingly, the invention relates to a level comprising:

an elongated, I-beam shaped body including a web, a top plate extending outwardly from both sides of the top of the web and a bottom plate extending outwardly from both sides of the bottom of the web;

an arm at one end of said body rotatable between a non-use position against one side of the web between the top and bottom plates, and a use position in which the body and the arm define a square;

notches in the flanges at one end of the body for receiving said arm in the use position to releasably lock the arm in the use position;

a plumb indicator in said body;

a level indicator in said body; and a slope indicator in said body.

BRIEF DESCRIPTION OF THE DRAWINGS

The invention is described below in greater detail with reference to the accompanying drawings, which illustrate a preferred embodiment of the invention, and wherein:

FIG. 1 is an isometric view of the level as viewed from above and one end;

FIG. 2 is an isometric view of the level of FIG. 1 as seen from below and the other end thereof;

DETAILED DESCRIPTION OF THE INVENTION

Figure 3:
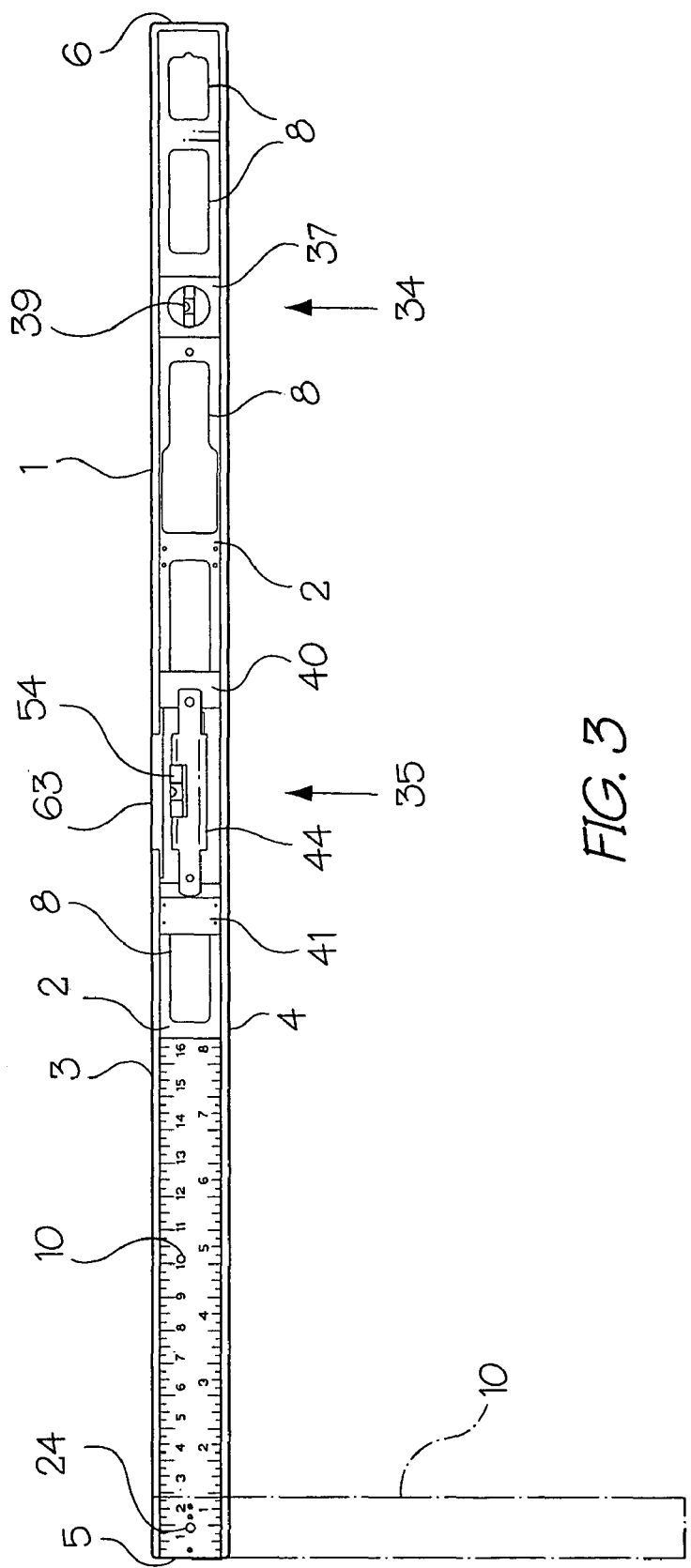
FIG. 3 is a side view of the level of FIGS. 1 and 2.
Figure 4:
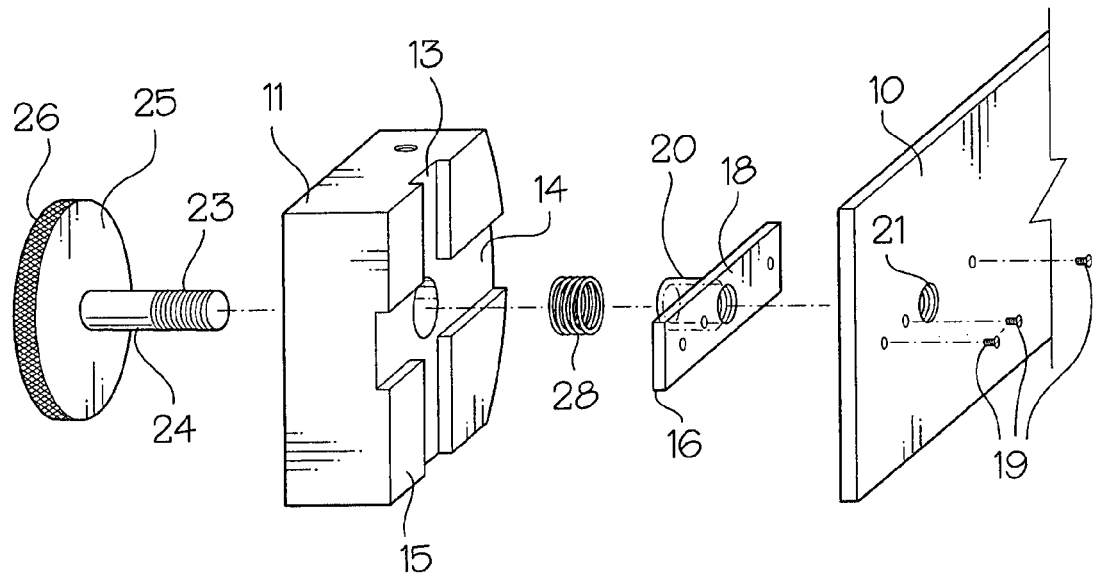
FIG. 4 is an exploded, isometric view of one end of the level of FIGS. 1 to 3.
Figure 5:
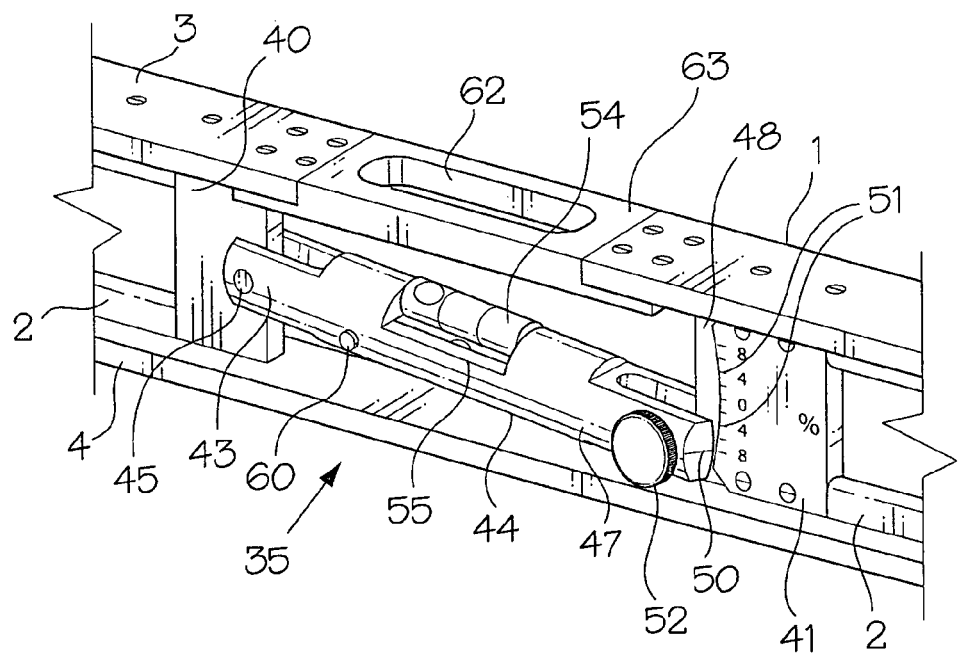
FIG. 5 is an isometric view of a slope indicator used in the level of FIGS. 1 to 3.

Referring to FIGS. 1 to 3 of the drawings, the basic elements of the level include an elongated I-beam shaped body 1 defined by a planar web 2, top and bottom plates or flanges 3 and 4, respectively, an open end 5 and an end plate 6. The flanges 3 and 4 are integral with the web 2. The web 2, top plate 3 and the bottom plate 4 can be in the form of an extrusion. In order to reduce the weight of the level, a plurality of openings 8 are provided in the web 2. As shown in FIG. 2, the bottom plate 4 of the level includes indicia 9, i.e. the bottom plate defines a ruler, which can be used as a straight-edge.

An arm 10, which is preferably a ruler marked off in inches and centimeters, is pivotally connected to a block 11 which is securely mounted between the top and bottom plates 3 and 4 at the open end 5 of the body 1. A cruciform-shaped groove defined by intersecting vertical and horizontal grooves 13 and 14, respectively is provided in one face 15 of the block for receiving a generally T-shaped nut 16. The nut 16 includes a rectangular end plate 18, which is connected to the inside surface of one end of the arm 10 by screws 19. An internally threaded sleeve 20 defines the stem of the nut 16. The sleeve 20 and a threaded hole 21 in the arm 10 receive the threaded end 23 of a bolt 24. The bolt 24 has a large, disc-shaped head 25 with a knurled periphery 26 to facilitate rotation of the bolt. A spring 28 on the sleeve 20 biases the nut 16 and the arm 10 outwardly, i.e. out of the grooves 13 and 14. When the bolt 24 is tightened, the nut 16 is drawn into one of the grooves 13 and 14, and consequently the arm 10 is drawn against the body 1. When the arm 10 is in a non-use position (FIGS. 1 and 2), i.e. when the level is not being used as a try square, the arm 10 is housed against the web 2 between the top and bottom plates 3 and 4, respectively of the level body 1. In order to move the arm 10 to the try square position shown in phantom outline in FIG. 3, the bolt 24 is loosened, and the spring 28 pushes the nut 16 and the arm 10 outwardly permitting rotation between the non-use and use positions. Notches 30 and 31 are provided on the arm side of the top and bottom plates 3 and 4 for receiving the arm 10 in the use position. Thus, the arm 10 can be rotated in either direction to a position perpendicular to the body 1 of the level and, when the bolt 24 is again tightened, the arm is drawn into a locked, i.e. non-rotatable position in the notches 30 and 31.

The body 1 of the level contains three indicators, namely a plumb indicator, a level indicator and a slope indicator which are indicated generally at 33, 34 and 35, respectively. The plumb indicator 33 and the level indicator 34 are off-the-shelf items including square bodies 36 and 37, respectively mounted in gaps in the web 2 of the level body 1, and spirit level tubes 38 and 39 mounted in the bodies 36 and 37, respectively. The plumb and level indicators 33 and 34, respectively perform in the same manner as in a conventional level.

Figure 6:
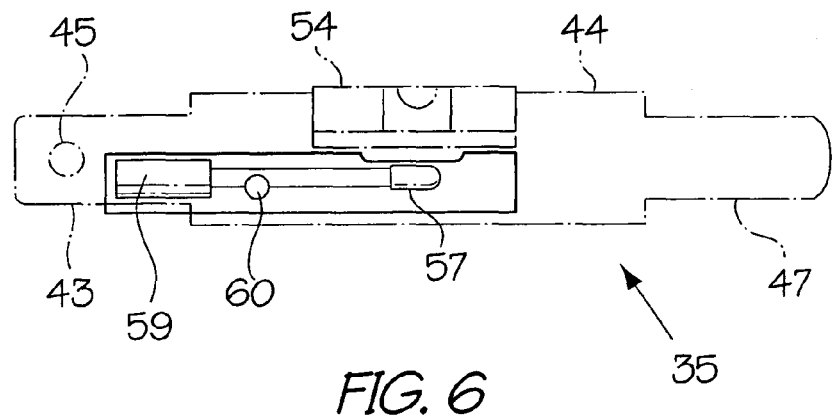
FIG. 6 is a schematic, sectional view of the slope indicator of FIG. 5.

The slope indicator 35 is mounted in a gap in the web 2 at the center of the body 1 between the webs 2. The slope indicator includes a pair of plates 40 and 41 mounted at the inner ends of the web sections. A bifurcated end 43 of a hollow, cylindrical indicator body member 44 is connected to the plate 40 by a pin 45. The other bifurcated end 47 of the body member 44 overlaps the narrow, inner free end 48 of the plate 41. The free end of one arm of the end. 47 includes a centerline 50 which, when the body member 44 is rotated becomes aligned with slope indicator lines 51 on the plate 41. The body member is locked in one position using a screw 52 which extends through one arm of the end 47 into engagement with the plate 41 to lock the body member in one position. A spirit level tube 54 is mounted in a notch 55 in the top center of the body member 44. The tube 54 is illuminated by a light in the form of an LED 57 (FIG. 6) mounted in the body member 44 beneath the tube 54. Power for the LED 57 is provided by a battery 59 mounted in the body member 44. The LED 57 is switched on and off using a push button switch 60, which extends outwardly through one side of the body member 44. An aperture 62 for viewing the level tube 54 is provided in a plate 63 defining the center portion of the top plate 3.

Figure 7:
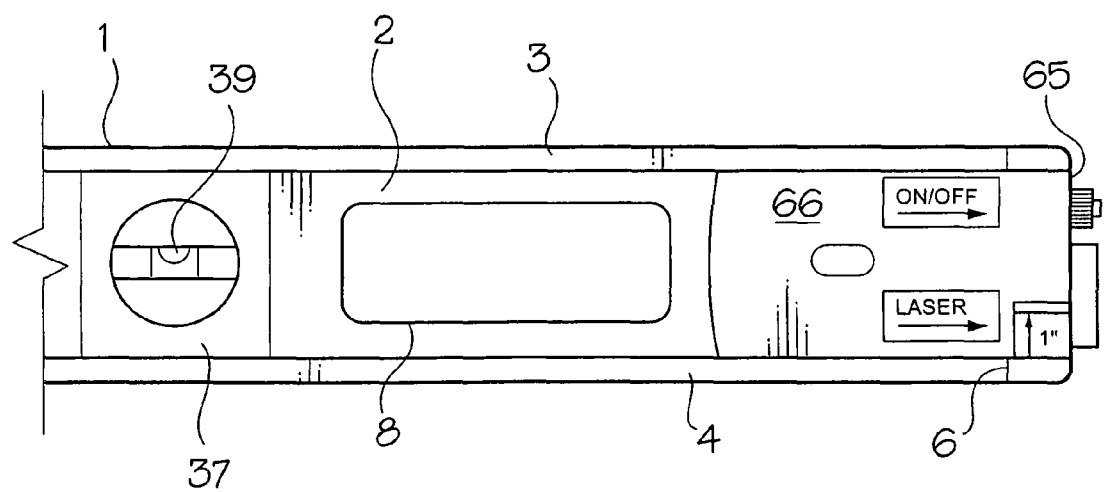
FIG. 7 is a side view of one end of the level of FIGS. 1 to 3 incorporating a laser pointer.

FIG. 7 of the drawings illustrates one end of another embodiment of the invention, which includes a laser pointer 65. The laser pointer 65 is an off-the-shelf item, the body 66 of which has been modified for mounting on the end 6 of the level body 1 between the top and bottom plates 3 and 4, respectively. The pointer 65 is used in conjunction with one of the indicators 33 or 34 for projecting a true vertical or horizontal line on a planar surface.

Figure 8:
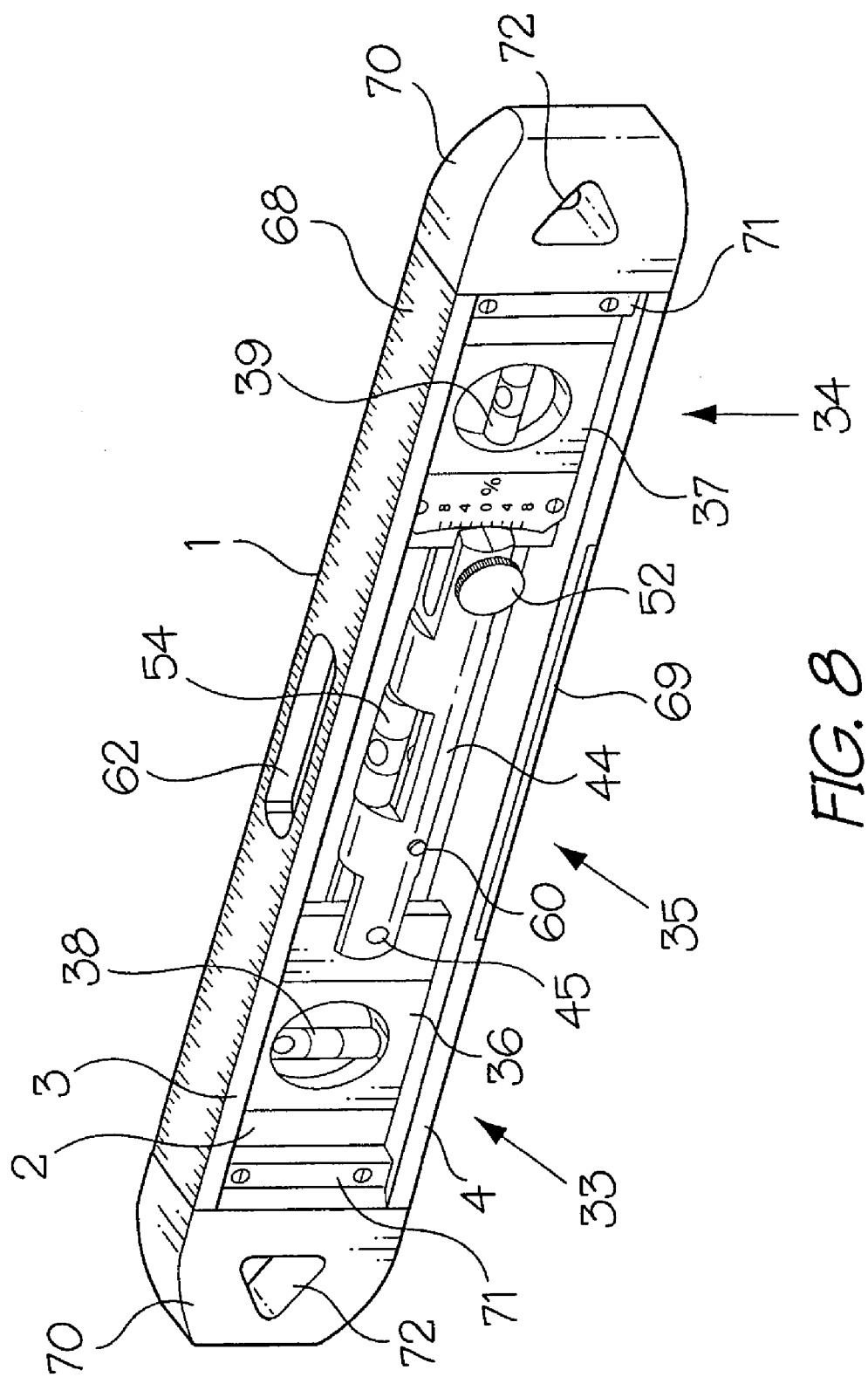
FIG. 8 is an isometric view of another embodiment of the level.

A level primarily intended for use by plumbers is shown in FIG. 8 of the drawings. Wherever possible the same reference numerals have been used to identify elements of FIG. 8 which are the same or similar to those of FIGS. 1 to 7.

As in the case of the level of FIGS. 1 to 3, the level of FIG. 8 includes an elongated I-beam-shaped body 1 defined by a planar web 2, and top and bottom flanges 3 and 4, respectively.

The top surface 68 of the flange 3 is a ruler marked off in inches and centimeters. The bottom flange 4 incorporates a magnetic strip 69 for picking up small ferromagnetic articles or for attaching the level to an object such as a stud, pipe or duct formed of ferromagnetic material.

Tapered plastic caps 70 are provided on the ends of the body 1. The caps 70 have bifurcated inner ends 71 overlapping the ends of the web 2. Triangular holes 72 in the caps 70 are used to hang the level on a hook or other support (not shown). The web 2 contains a plumb indicator 33, a level indicator 34 and a slope indicator 35 which are the same as the corresponding elements in the level of FIGS. 1 to 3. One of the caps 70 can be replaced by a laser pointer (not shown).

The invention claimed is:

1. A level comprising:
   an I-beam shaped body including a web, a top plate extending outwardly from both sides of the top of the web and a bottom plate extending outwardly from both sides of the web;
   an arm at one end of said body rotatable between a non-use position against one side of the web between the top and bottom plates, and a use position in which the body and the arm define a square;
   notches in the top and bottom plates on said one side of the web at said one end of the body for receiving said arm in the use position to releasably lock the arm in the use position;
   a plumb indicator in said body;
   a level indicator in said body; and
   a slope indicator in said body.

2. The level of claim 1 including a laser pointer mounted on a second end of said body.

3. The level of claim 1, wherein:
   said slope indicator includes a hollow body member having a first end pivotally mounted in a gap in said web for rotation around an axis perpendicular to the web;
   a spirit level tube in said body member; and
   an indicator line on a second, free end of said body member for alignment with slope indicator lines on said web.

4. The level of claim 3, wherein said slope indicator includes an aperture in the top plate of said body for viewing the spirit level tube.

5. The level of claim 3, wherein said first and second ends of said slope indicator body member are bifurcated and overlap said web at each end of the gap therein.

6. The level of claim 5, including a screw in said second end of said slope indicator body member for engaging said web to lock the body member in a fixed position.

7. The level of claim 3, wherein said slope indicator includes a light in said body member beneath said spirit level tube.

8. The level of claim 1 including:
   a block in one end of said body between said top and bottom plates; vertical and horizontal grooves in said block;
   a nut attached to an inner surface of said arm for mating with either of said grooves; and
   a bolt extending through said block into said nut for releasably retaining said nut in one said groove.

* * * * *